Patented Mar. 11, 1930

1,749,854

UNITED STATES PATENT OFFICE

KARL STAIB, OF BITTERFELD, GERMANY, ASSIGNOR TO I. G. FARBENINDUSTRIE AKTIENGESELLSCHAFT, OF FRANKFORT-ON-THE-MAIN, GERMANY, A FIRM

MANUFACTURE OF ANHYDROUS MAGNESIUM CHLORIDE

No Drawing. Application filed May 6, 1926, Serial No. 107,269, and in Germany May 9, 1925.

This invention relates to the manufacture of anhydrous magnesium chloride. It is well known that magnesium oxid mixed with carbon in a current of chlorine may be transformed at an elevated temperature to anhydrous magnesium chloride. When this reaction is carried out at temperatures above the melting-point of magnesium chloride, it is found that the contact surfaces between gas and oxid in the molten mass successively formed become so small that the reaction velocity is practically reduced too far. On the other hand, if temperatures were employed at which the magnesium chloride formed was not brought to fusion during the operation, it was hitherto deemed necessary to have the magnesia employed with the admixture of carbon completely freed from water. However, in this case the reaction generally does not take place with the completeness which is required for technical purposes, because it has been found that this reaction takes place to a satisfactory extent only when the magnesia employed is present in a distinct form having to all appearances a special reactivity. This form of magnesium oxid, however, as, for instance, "magnesia usta" is not to be taken into consideration for manufacturing on a large scale owing to its high price. When however cheaper magnesium oxids are used, for instance, burned magnesia from the decomposition of magnesium chloride or caustic magnesite, it is found that these magnesium oxids, even when finely ground and intimately mixed with carbon, after having been exposed to a current of chlorine for 24 hours at 500 to 650° C. still contain 20 to 30 per cent of unchanged magnesium oxid.

Now by exhaustive examination of the reactions in question I have discovered a relationship which has suggested to me a new method of operating that forms the object of the present invention. According to this method, I take oxygenic magnesium compounds (MgO, $MgCO_3$ &c.) and mix them with the required reducing agent such as coal and further with substances capable of producing pores in the mass when heated. This mass is moulded so as to form pieces and then subjected to chlorination at temperatures below the melting-point of magnesium chloride. In this way, considering the distribution of the constituents of the mixture, sufficient free space is produced by the pores to permit of the enlargement of volume caused by the transformation of magnesium oxid to solid magnesium chloride.

In this connection I have found that the matter in question is not one of a greater or less reaction inertia depending on the density of the oxygenic grain, but it is only a question of space, in as much as every kind of magnesia was found to be capable of being readily and completely transformed to magnesium chloride, the grain of which is surrounded by a sufficient free space to permit of its complete transformation to the considerably more voluminous molecule of solid magnesium chloride, and, of course, by a further space sufficient to warrant the maintenance of the porosity required for the free access of the gases to all parts of the mass under treatment. The space required is a considerable one; for instance, the space produced by the removal of the carbon dioxid by calcining $MgCO_3$ is not sufficient.

This having been recognized, the problem to be solved was to find out a method or methods to transform a magnesia of any description into a suitable distribution at the temperature of the reaction between magnesia and chlorine, that is to say to give the magnesia mixture the required porosity and, at the same time, to form the reaction charge in such a manner that a production on a large scale is rendered possible.

Of such ways I may mention the following:—

1. Magnesia oxid is transformed into magnesium oxychloride. As starting material a magnesium oxid of any description (that is to say of any density) is chosen which, after the addition of the required quantity of carbon and with the admixture of suitable quantities of hydrated magnesium chloride, f. i. molten hydrated magnesium chloride or magnesium chloride solutions of suitable strength, is in a suitable fine distribution capable of setting to form a solid mass, which may be subjected to (gradual, if desired) dehydration. Magnesium oxychloride, obtained in any of the known ways, f. i. in the manufacture of hydrochloric acid from magnesium chloride, meets the requirements of the present invention.

This mass thus obtained from magnesium oxid and magnesium chloride has three properties important as to the manufacture of anhydrous magnesium chloride, but not remarked hitherto.

(a) The mass remains infusible during the heating in spite of the high percentage of water initially contained therein; therefore such a mass may be heated in any desired shaft- or rotary-furnace to every temperature nearly up to the melting-point of anhydrous magnesium chloride and may be treated with chlorine without any danger of melting down.

(b) By treating with magnesium chloride the magnesia employed—either burned magnesite, which need not be completely transformed into caustic magnesite, but may still contain a certain amount of magnesium carbonate, or a magnesia of any other description—is transformed into a hydrated, spongy oxychloride, that is to say, dissociated to some extent, and forms, as such, a mass which on further heating attains the desired porosity by removing the water and, under certain conditions, by splitting off small quantities of hydrochloric acid. Hereby the magnesia is brought into a form that permits of a rapid chlorination. Whereas, for instance, of burned magnesite, mixed with coal only, scarcely one half is transformed into magnesium chloride after 2 hours at 550° C., magnesite set with magnesium chloride and water is transformed up to a final percentage of 5 to 6 per cent of MgO in the same time.

(c) Furthermore it is advantageous that the mixture of magnesia and coal now can be produced in the form of molded pieces of any desired shape by automatic setting and hardening with hydrated magnesium chloride. Hitherto the mixture was to be briquetted with tar in order to bring it into a form adapted for shaft-furnaces.

Contrary to the processes hitherto known for obtaining anhydrous magnesium chloride from any hydrated magnesium chloride compound, my invention involves a considerable technical progress, inasmuch as the separate dehydration of the hexahydrate, which is to be carried out in several steps and even in the last step produces great quantities of hydrochloric gases, may be dispensed with. With my present process the quantity of hydrochloric acid formed is by far less than when exclusively hydrated magnesium chloride is employed, and may be adjusted at will by varying the proportions of MgO and $MgCl_2$.

2. A second method consists in increasing the porosity of the mixture to be chlorinated by the addition of substances which after having finished the production of pores still serve to reduce the magnesium oxid. Following this method the proportion of $$MgO : MgCl_2$$

in the reaction mixture may preferably be the more increased, the more of the pore-producing substances of this kind is added. Accordingly the coke or coal powder referred to in the foregoing paragraph is partly or wholly replaced by saw dust, peat, brown coal dust or similar substances which when mixed with MgO occupy a large volume and form pores to a considerable extent when burned to coke. To these substances sufficient to produce the desired porosity, but at least also to effect the reducing action the finely ground MgO and magnesium chloride solution are added and the mixture is allowed to set. The formed bodies thus obtained are dried by heating and, by heating to beginning coking freed from the water absorbed, the porosity being always preserved or increased. The reaction with the chlorine current begins before the coking has reached a considerable extent and becomes more vigorous by the co-operation of the carbon which is seemingly activated by the action of the magnesium chloride, whereby the temperature is increased. The finely distributed coke formed in the mass is burned by the oxygen liberated by the formation of chloride.

*Example 1*

200 kgs. of $MgCl_2 \cdot 6H_2O$ are molten and 40 kgs. of burned magnesite, finely ground and well mixed with 19 kgs. of coal, are added and the constituents are quickly and well stirred together. The mass soon solidifies under strong development of heat and foaming up. It is broken up to pieces of suitable size which are exposed to a current of chlorine in a shaft-furnace at a temperature gradually increasing to a temperature below the melting-point of anhydrous magnesium chloride. The mass is hereby preliminarily dried, or it may be dried in a separate chamber. After a certain time (the length of which depends on the weight of the charge, the reaction being an exothermic one) the mass is transformed at about 500 to 550° C. into technically anhydrous magnesium chloride and may be continuously withdrawn from the furnace. The production of the furnace depends on the chlorinating velocity.

*Example 2*

400 kgs. of causticized magnesite are finely ground and well mixed with 30 kgs. of charcoal and 150 kgs. of saw dust, and the mixture is thoroughly moistened with about 500 liters of magnesium chloride solution of about 22° Bé. The mass is formed to suitable pieces and after 24 hours has become as hard as stone. It may be reduced to grains of proper size by breaking up and dried in a suitable chamber heated up to 350° C., whereby the saw dust is coked. For the rest, the mass is further treated according to Example 1, for instance it is immediately subjected to chlorination.

I claim:—

1. In the process of producing anhydrous magnesium chloride by interaction of magnesium oxide and chlorine, the improvement which comprises the steps of mixing magnesium oxide with a binder and a reducing substance and a substance capable of producing, when heated, a porosity corresponding at least to the increase in volume caused by the transformation of said magnesium oxide to solid magnesium chloride, forming pieces of said mixture, heating said pieces to a temperature sufficient to produce said porosity and causing the pieces to react with chlorine at a high temperature but below the melting point of magnesium chloride.

2. In the process of producing anhydrous chloride by interaction of magnesium oxide and chlorine, the improvement which comprises the steps of mixing magnesium oxide with a binder and with reducing substances capable of producing, when heated, a porosity corresponding at least to the increase in volume caused by the transformation of said magnesium oxide into solid magnesium chloride, forming pieces of said mixture, heating said pieces to coking temperature and causing the pieces to react with chlorine at a high temperature but below the melting point of magnesium chloride.

3. In the process of producing anhydrous magnesium chloride by interaction of magnesium oxide and chlorine, the improvement which comprises the steps of mixing magnesium oxide with a binder and a reducing substance and a substance capable of producing, when heated, a porosity corresponding at least to the increase in volume caused by the transformation of said magnesium oxide to solid magnesium chloride, forming pieces of said mixture, heating said pieces to a temperature sufficient to produce said porosity and causing the pieces to react with chlorine at a temperature substantially between about 500° C. and the melting point of magnesium chloride.

4. In the process of producing anhydrous chloride by interaction of magnesium oxide and chlorine, the improvement which comprises the steps of mixing magnesium oxide with a binder and with reducing substances capable of producing, when heated, a porosity corresponding at least to the increase in volume caused by the transformation of said magnesium oxide into solid magnesium, chloride, forming pieces of said mixture, heating said pieces to coking temperature and causing the pieces to react with chlorine at a temperature substantially between about 500° C. and the melting point of magnesium chloride.

5. In the process of producing anhydrous magnesium chloride by interaction of magnesium oxid and chlorine, the improvement which comprises the steps of mixing magnesium oxid with a binder and with reducing substances capable of producing, when heated, a porosity, corresponding at least to the increase of volume caused by the transformation of the said magnesium oxid to solid magnesium chloride, forming pieces of the said mixture, heating said pieces to coking temperatures and causing the hot pieces to react with chlorine at a temperature between 500° C. and the melting point of magnesium chloride, said temperatures being produced by reaction heat.

6. In the process of producing anhydrous magnesium chloride by interaction of magnesium oxide and chlorine, the improvement which comprises the steps of mixing magnesium oxid with hydrated magnesium chloride and reducing substances capable of producing, when heated, together with the said hydrated magnesium chloride, a porosity, corresponding at least to the increase of volume caused by the transformation of the said magnesium oxid to solid magnesium chloride, forming pieces of the said mixture, heating said pieces to coking temperatures and causing the hot pieces to react with chlorine at a temperature between 500° C. and the melting point of magnesium chloride, said temperatures being produced by reaction heat.

7. In the process of producing anhydrous magnesium chloride by interaction of magnesium oxid and chlorine, the improvement which comprises the steps of mixing magnesite at least partially calcined with a binder and reducing substances capable of producing, when heated, a porosity corresponding at least to the increase of volume caused by the transformation of the said magnesium oxid to solid magnesium chloride, forming pieces of the said mixture, heating said pieces to coking temperatures and causing the hot pieces to react with chlorine at a temperature between 500° C. and the melting point of magnesium chloride, said temperatures being produced by reaction heat.

8. In the process of producing anhydrous magnesium chloride by interaction of magnesium oxid and chlorine, the improvement which comprises the steps of mixing magnesite at least partially calcined with hydrated magnesium chloride and reducing substances capable of producing, when heated, together with the said hydrated magnesium chloride, a porosity, corresponding at least to the increase of volume caused by the transformation of the said calcined magnesite solid magnesium chloride, forming pieces of the said mixture, heating said pieces to coking temperatures and causing the hot pieces to react with chlorine at a temperature between 500° C. and the melting point of magnesium chloride, said temperatures being produced by reaction heat.

9. In the process of producing anhydrous magnesium chloride by interaction of magnesium oxid and chlorine, the improvement which comprises the steps of mixing magnesite at least partially calcined with a binder and with reducing substances capable of producing, when heated, a porosity, corresponding at least to the increase of volume caused by the transformation of the said magnesium oxid to solid magnesium chloride, forming pieces of the said mixture, heating said pieces to coking temperatures, continuously feeding the hot pieces into a suitable furnace whilst introducing chlorine, heating to a temperature between 500° C. and the melting point of magnesium chloride, and continuously withdrawing the unmolten product, said temperature being produced by reaction heat.

10. In the process of producing anhydrous magnesium chloride by interaction of magnesium oxid and chlorine, the improvement which comprises the steps of mixing magnesite at least partially calcined with hydrated magnesium chloride and with reducing substances capable of producing, when heated, a porosity, corresponding at least to the increase of volume caused by the transformation of the said magnesium oxid to solid magnesium chloride, forming pieces of the said mixture, heating said pieces to coking temperatures, continuously feeding the hot pieces into a suitable furnace whilst introducing chlorine, heating to a temperature between 500° C. and the melting point of magnesium chloride, and continuously withdrawing the unmolten product, said temperature being produced by reaction heat.

In testimony whereof I affix my signature.

KARL STAIB.